United States Patent [19]

Sortwell, III

[11] 3,940,500

[45] Feb. 24, 1976

[54] FLAVORING SEAFOOD WITH S-METHYL METHIONINE SALT

[76] Inventor: Daniel Richard Sortwell, III, 113 S. Main St., Sherborn, Mass. 01770

[22] Filed: Aug. 10, 1973

[21] Appl. No.: 387,496

[52] U.S. Cl. ................................................. 426/535
[51] Int. Cl.² .......................................... A23L 1/226
[58] Field of Search ........... 260/534 S; 426/65, 175, 426/535

[56] References Cited
OTHER PUBLICATIONS

Chemical Abstracts, Vol. 70, 1969, 10474s.

Chemical Abstracts, Vol. 68, 1968, 57701m.

"Symposium on Foods: The Chemistry and Physiology of Flavors," Edited by Schultz, et al., 1967, Avi Publishing: Westport, Conn., pp. 364–367.

Primary Examiner—Joseph M. Golian
Attorney, Agent, or Firm—Merriam, Marshall, Shapiro & Klose

[57] ABSTRACT

A comestible material, such as seafood, is given a scallop flavor by the addition of a compound containing a dimethylthio group, such as a S-methyl methionine salt, acceptable in foods.

12 Claims, No Drawings

FLAVORING SEAFOOD WITH S-METHYL METHIONINE SALT

This invention relates to the flavoring of comestible materials. More particularly, this invention is concerned with the discovery that compounds having a dimethylthio group which release dimethyl sulfide such as a S-methyl methionine salt, improve the flavor of, and impart flavor to, comestible materials when added thereto.

It has been previously found that the primary flavor of scallops is due to the presence of dimethyl sulfide released by a natural precursor in the scallops. One identified natural precursor is dimethyl-beta-propiothetin at 0.14 to 0.18 mg/gm in scallop muscle as reported by Ackman and Hingley in *Journal of Fisheries*, Research Board of Canada, Vol. 25, No. 2, p. 267 (1968). Since the scallop flavor is particularly delectable, it was thought that this flavor could be imparted to other comestible materials, and further enhanced in scallops themselves, by adding dimethyl sulfide to such materials. Efforts to flavor shrimp, conch, quahog, crab, lobster and even scallops by use of dimethyl sulfide have been commercially unsuccessful because of the extreme volatility of dimethyl sulfide (b.p. 102.2°F.; flash point −55°F.). Because of the extreme volatility of dimethyl sulfide, the flavor escapes from the comestible material on storage. Even a dimethyl sulfide flavored, precooked and then frozen fish product retains the scallop flavor for only a very short residence time when it is subsequently warmed. In addition, the dimethyl sulfide flavoring agent is hazardous to work with and store. The release of dimethyl sulfide from flavored foods held in refrigerators in stores and markets is also a potential hazard because accumulations of dimethyl sulfide could present a fire hazard due to its extreme flammability. There is thus a need for a suitable means to impart scallop flavor to comestible materials.

According to the present invention, it has been found that when a compound containing a dimethylthio group is added to a comestible material there is a formation and release of dimethyl sulfide which imparts a delectable scallop flavor to the comestible material. It presently appears that any relatively stable compound acceptable in foods which contains a dimethylthio group can be used in the invention. An adjunct of the invention is the discovery that a dimethylthio containing compound can be added to a comestible material at a level below the threshold level which imparts a scallop flavor to enhance the natural or normal flavor of the comestible material.

Particular compounds which can be used in practicing the invention are S-methyl methionine salts, and particularly the chloride, bromide and iodide salts thereof. The salts of S-methyl methionine are readily produced by combining S-methyl methionine with methyl chloride, methyl iodide or methyl bromide following the procedures normally used to make sulfonium salts. Similar salts of methylthiopropionic acid can also be used in the invention.

S-methyl methionine chloride is the preferred salt for use in the invention. It is a solid stable material at room temperature and moderately elevated temperatures. It is safe and easy to handle and presents none of the problems inherent in the use of dimethyl sulfide. The following discussion will therefore be directed to the use of this compound in practicing the invention although it should be understood that any other suitable compound containing a dimethylthio group can be used in its place.

S-methyl methionine chloride can be added to any natural or synthetic comestible material which does not react adversely with it to suppress the desired flavor imparting or enhancing activity. Some comestible materials to which S-methyl methionine chloride can be added are flesh or meat of seafoods of the fish and crustacean types including croaker, flounder, sole, conch, shrimp, quahog, crab, lobster and scallops. S-methyl methionine chloride can also be added to plant derived materials of the protein, carbohydrate and starch types. It is especially useful in the flavoring of high protein products derived from soybeans, cottonseeds and other plant source protein products.

The S-methyl methionine chloride can be readily added as a solid by pouring or sprinkling it over the comestible material to be flavored. It can also be added in a liquid carrier such as water to facilitate its distribution throughout the comestible material. These and other means of achieving thorough and ready addition of a small amount of an added ingredient to a larger amount of a substance are well known to those skilled in the food art.

The amount of S-methyl methionine chloride to be incorporated in, or added to, a comestible material is not narrowly critical. Enough however should be added to obtain the desired flavor. In this regard, it is generally unnecessary to incorporate more than 0.5% by weight of S-methyl methionine chloride in a comestible material to achieve the desired scallop flavor. It is, of course, feasible to use more than 0.5% by weight in comestible materials which have an unusually strong natural flavor that it is desired to overcome. For many foods, especially seafoods, an added amount of S-methyl methionine chloride up to 0.3% by weight is often adequate to impart the scallop flavor. There is no minimum amount of S-methyl methionine chloride to be added but it is generally advisable to add at least 0.01% by weight of the flavoring agent to obtain a scallop flavor. Lesser amounts can be used, however, in those instances in which it is desired to enhance the flavor of the comestible material and not impart any, or a modicum degree, of scallop flavor in the product. Thus, S-methyl methionine chloride can be used to enhance the flavor of foods if used sparingly at levels below the threshold identity of scallop flavor where flavor stability of a precursor for dimethyl sulfide is a necessary requirement.

The following examples are presented to further illustrate the invention. The S-methyl methionine chloride used in the examples is the product of Degussa Inc., Frankfort, West Germany.

EXAMPLE 1

A mixture was made of the following materials:

|  | Percent by Weight |
| --- | --- |
| Deboned comminuted fish flesh (Gulf croaker) | 99.9 |
| S-methyl methionine chloride | 0.1 |

The mixture was stirred well to obtain a uniform product and then frozen. A one-half ounce portion of the frozen mixture was then heated in an oven at 450°F. for 10 minutes together with a frozen fish flesh control containing no added S-methyl methionine chloride. The sample containing the added S-methyl methionine chloride had a delectable scallop flavor after cooking while the control sample had a fish flavor.

EXAMPLE 2

A mixture was prepared of the following materials:

| | Percent by Weight |
|---|---|
| Deboned comminuted fish flesh (Gulf croaker) | 97.85 |
| Shrimp meat | 2.00 |
| S-methyl methionine chloride | 0.15 |

A control sample was prepared of the same materials but without the added S-methyl methionine chloride. The test mixture and the control mixture, after thorough mixing, were frozen. Then one-half ounce portions of each frozen mixture were heated in an oven at 450°F. for 15 minutes. The test sample containing the added S-methyl methionine chloride had a tasty scallop flavor while the control sample, without added S-methyl methionine chloride, tasted like fish.

EXAMPLE 3

A mixture was prepared of the following materials:

| | Percent by Weight |
|---|---|
| Deboned comminuted fish flesh (Gulf croaker) | 96.9 |
| Crab meat | 3.0 |
| S-methyl methionine chloride | 0.1 |

The composition was thoroughly mixed. A one-half ounce portion of the composition was breaded and then fried at 385°F. for 2 minutes. The cooked product had a good scallop flavor.

EXAMPLE 4

A mixture was prepared of the following materials:

| | Percent by Weight |
|---|---|
| Deboned comminuted fish meat (Gulf croaker) | 99.99 |
| S-methyl methionine chloride | 0.01 |

After being thoroughly mixed a one ounce portion of the mixture was breaded, pre-cooked by frying it at 290°F. for 20 seconds, frozen and then cooked in an oven at 450°F. for 10 minutes. The cooked product had a slight scallop flavor.

The foregoing detailed description has been given for clearness of understanding only, and no unnecessary limitations should be understood therefrom, as modifications will be obvious to those skilled in the art.

What is claimed is:

1. The process which comprises adding to a seafood product an effective amount up to about 0.5% by weight of the seafood of a salt of S-methyl methionine to improve the flavor or impart flavor to the seafood product.

2. The process of claim 1 in which the seafood product is at least 75% by weight fish flesh.

3. The process of claim 1 in which up to about 0.3% by weight of a salt of S-methyl methionine is added to the seafood product.

4. The process of claim 1 in which about 0.01% to 0.15% by weight of a salt of S-methyl methionine is added to the seafood product.

5. The process of claim 4 in which the salt of S-methyl methionine is S-methyl methionine chloride.

6. The process which comprises adding to a fish flesh product about 0.01% to 0.15% by weight of the fish flesh product of a salt of S-methyl methionine so that the flavor of the fish flesh product is improved upon subsequent cooking.

7. A seafood product containing an effective amount up to about 0.5% by weight of the seafood product of a salt of S-methyl methionine to improve the flavor or impart flavor to the seafood product.

8. A seafood product according to claim 7 in which the seafood is at least 75% by weight fish flesh.

9. A seafood product according to claim 7 containing up to about 0.3% by weight of a salt of S-methyl methionine.

10. A seafood product according to claim 7 containing about 0.01% to 0.15% by weight of a salt of S-methyl methionine.

11. A seafood product according to claim 10 in which the salt of S-methyl methionine is S-methyl methionine chloride.

12. A seafood product according to claim 10 in which the seafood product is at least 75% by weight fish flesh.

* * * * *